United States Patent
Freedman et al.

(10) Patent No.: US 12,332,889 B2
(45) Date of Patent: **\*Jun. 17, 2025**

(54) MULTI-STEP QUERY EXECUTION IN SQL SERVER

(71) Applicant: Microsoft Technology Licensing, LLC, Redmond, WA (US)

(72) Inventors: Craig Steven Freedman, Sammamish, WA (US); Chandrashekhar Kadiam, Bothell, WA (US); Devin L. Rider, Renton, WA (US); Daniel Georg Schall, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,640

(22) Filed: Oct. 16, 2023

(65) Prior Publication Data
US 2024/0045865 A1    Feb. 8, 2024

Related U.S. Application Data

(63) Continuation of application No. 16/153,718, filed on Oct. 6, 2018, now Pat. No. 11,829,363.

(51) Int. Cl.
*G06F 16/2453* (2019.01)
*G06F 16/22* (2019.01)

(52) U.S. Cl.
CPC .... *G06F 16/24542* (2019.01); *G06F 16/2246* (2019.01); *G06F 16/24535* (2019.01)

(58) Field of Classification Search
None
See application file for complete search history.

(56) References Cited

U.S. PATENT DOCUMENTS

| | | | |
|---|---|---|---|
| 2002/0133497 A1* | 9/2002 | Draper | G06F 16/258 707/999.1 |
| 2005/0021661 A1* | 1/2005 | Duloutre | G06F 16/24552 709/217 |

(Continued)

FOREIGN PATENT DOCUMENTS

| | | |
|---|---|---|
| CN | 101178727 A | 5/2008 |
| CN | 105210058 A | 12/2015 |
| CN | 108431805 A | 8/2018 |

OTHER PUBLICATIONS

First Office Action Received for Chinese Application No. 201980065686.3, mailed on Jan. 12, 2024, 14 pages.

(Continued)

*Primary Examiner* — Kannan Shanmugasundaram
(74) *Attorney, Agent, or Firm* — Weaver IP L.L.C.

(57) ABSTRACT

Methods, systems, and computer program products are provided that construct and execute multi-step query plans in a database application. A database application accepts a query such as, for example, a graph query. The database application generates a physical query plan comprising a set of execution steps that perform the query. The set of execution steps comprises at least an initial step, an intermediate step and a final step. The database executes the query by passing control to the initial step that, when complete, passes execution control to some other step. The intermediate step executes and when complete, may pass execution control to any other step including itself. Steps may be configured to communicate arbitrary data between steps. The generated query plan may also comprise multiple multi-step sequences, and such sequences may be configured to execute in the alternative based on intermediate query results, or a parameter included in the query.

20 Claims, 9 Drawing Sheets

400

```
     ┌─ SELECT * FROM Employee n1, WorkingWith e1, Employee n2
     │              406
402 403─
     │   ── WHERE MATCH(shortest_path(n1(-(e1)->n2)+) and
     │                408            410
404 ─┘         n1.Role = 'Architect' and n2.Role = 'PM'
```

(56) References Cited

U.S. PATENT DOCUMENTS

| | | | |
|---|---|---|---|
| 2006/0136396 A1* | 6/2006 | Brobst | G06F 16/24549 707/999.003 |
| 2009/0070313 A1* | 3/2009 | Beyer | G06F 16/24 707/999.005 |
| 2010/0198806 A1* | 8/2010 | Graefe | G06F 16/24542 707/E17.014 |
| 2011/0029508 A1* | 2/2011 | Al-Omari | G06F 16/24524 707/718 |
| 2014/0181079 A1* | 6/2014 | Ghazal | G06F 16/24535 707/718 |
| 2015/0026158 A1* | 1/2015 | Jin | G06F 16/90335 707/769 |
| 2017/0116271 A1* | 4/2017 | Ziauddin | G06F 16/24539 |
| 2017/0139991 A1* | 5/2017 | Teletia | G06F 16/9024 |

OTHER PUBLICATIONS

Communication under Rule 71(3) received in European Application No. 19842762.7, mailed on Apr. 4, 2024, 8 pages.

Notification of Second Office Action Received for Chinese Application No. 201980065686.3, mailed on May 29, 2024, 7 pages (English Translation Provided).

Decision to grant a European patent pursuant to Article 97(1) received in European Application No. 19842762.7, mailed on Aug. 8, 2024, 2 pages.

Notice of Allowance Received for Chinese Application No. 201980065686.3, mailed on Dec. 17, 2024, 02 pages (English Translation Not Provided).

* cited by examiner

200

| Node Table 'Employee' | | |
|---|---|---|
| NodeID | EmployeeName | Role |
| N1 | ar1 | Architect |
| N2 | emp1 | Receptionist |
| N3 | ar2 | Architect |
| N4 | pm1 | PM |

300

| Edge Table 'WorkingWith' | | |
|---|---|---|
| EdgeID | FromNode | ToNode |
| Edge1 | N1 | N2 |
| Edge2 | N2 | N3 |
| Edge3 | N2 | N4 |
| Edge4 | N3 | N4 |

400

```
       SELECT * FROM Employee n1, WorkingWith e1, Employee n2
                                  406
402  403
       WHERE MATCH(shortest_path(n1(-(e1)->n2)+) and
                  408                    410
404        n1.Role = 'Architect' and n2.Role = 'PM'
```

FIG. 4

| 500 | All paths 502 | | All paths between Architects and Program Managers 504 | Shortest path between all Architects and Program Managers 506 |
|---|---|---|---|---|
| | N1-N2 | N2-N1 | N1-N2-N3-N4 | N1-N2-N4 |
| | N1-N2-N3 | N2-N3 | N1-N2-N4 | N3-N4 |
| | N1-N2-N3-N4 | N2-N3-N4 | N3-N4 | |
| | N1-N2-N4 | N2-N4 | N3-N2-N4 | |
| | N1-N2-N4-N3 | N2-N4-N3 | | |
| | N3-N4 | N4-N3 | | |
| | N3-N4-N2 | N4-N3-N2 | | |
| | N3-N4-N2-N1 | N4-N3-N2-N1 | | |
| | N3-N2 | N4-N2 | | |
| | N3-N2-N1 | N4-N2-N1 | | |
| | N3-N2-N4 | N4-N2-N3 | | |

Query - 802

```
select * from n1, n2, n3, e1, e2 where match(shortest_path(n1(-(e1)->n2-(e2)->n3)+))
```

Effective Query - 804

```
with x (e1_from_id, e1_from_obj_id, e2_to_id, e2_to_obj_id, depth) as (
```
⟶ CTE Select List 806

```
    select e1.from_id, e1.from_obj_id, e2.to_id, e2.to_obj_id, 1
    from e1 inner join e2
        on e1.to_id = e2.from_id
    left outer join n2
        on n2.graph_id = e2.from_id
    where e1.to_obj_id = object_id('n2') and e2.from_obj_id = object_id('n2')
```
⟵ Anchor Member 808

```
    union all select x.e1_from_id, x.e1_from_obj_id, e2.to_id, e2.to_obj_id, x.depth + 1
    from x inner join e1
        on x.e2_to_id = e1.from_id
    inner join e2
        on e1.to_id = e2.from_id
    left outer join n2
        on e2.from_id = n2.graph_id
    left outer join n3
        on x.e2_to_id = n3.graph_id
    where x.e2_to_obj_id = object_id('n3')
        and e1.from_obj_id = object_id('n3')
        and e1.to_obj_id = object_id('n2')
        and e2.from_obj_id = object_id('n2')
```
⟵ Recursive Member 810

```
)
select *
from x left join n1
    on x.e1_from_id = n1.graph_id
left join n3 on x.to_id = n3.graph_id
where x.e1_from_obj_id = object_id('n1')
    and x.to_obj_id = object_id('n3')
```
⟵ Outer Select Query 812

1300

1302 — Determine which of the first and second sets of execution steps to execute based at least in part on an optional parameter included in the query

1402 — Process the query by generating the query plan to include an execution step configured to communicate data to one or more execution steps of the query plan

1502 — Generate a first sub-plan comprising at least one execution step

1504 — Execute the first sub-plan to generate a first sub-plan result

1506 — Generate a second sub-plan comprising at least one execution step based at least in part on the first sub-plan result, the second sub-plan configured to generate a second sub-plan result when executed by the query execution engine, and wherein any subsequent execution of the second sub-plan will re-use the first sub-plan result

1602 — Re-generate at least a portion of the query plan during execution of the query plan

FIG. 16

MULTI-STEP QUERY EXECUTION IN SQL SERVER

CROSS-REFERENCE TO RELATED APPLICATION(S)

The present application is a continuation of co-pending U.S. patent application Ser. No. 16/153,718, entitled "MULTI-STEP QUERY EXECUTION IN SQL SERVER," filed on Oct. 6, 2018, the entirety of which is incorporated by reference herein.

BACKGROUND

The modern digital world is experiencing exponential growth in the data volume associated with all facets of business and personal life. Solutions for efficient storage and recall of such information is in great demand. Businesses in particular have a need to transform collected and stored data into actionable intelligence. Relational database systems, and applications written to leverage such systems, are the traditional tool for describing, storing and retrieving business information. More recently, however, there has been an increased demand for graph database systems.

Instead of the traditional columns and rows of a relational database table, graph databases store data in form of nodes and edges. A node represents a distinct data value or set of related values, and edges connect the nodes and thereby represent relationships therebetween. Edges may likewise have one or more related values (e.g., a duration of the relationship. For example, data related to company employees may be represented by a node for each employee, and edges may connect employees that work with one another thereby representing the relationships of co-workers. In another example, an edge connecting a buyer and product may represent a product purchase, and may have attributes such as sale price, quantity, date, etc. A complete picture of all the nodes with all interconnecting edges is referred to as a graph.

Storing information in the form of a graph (as opposed to a native relational database table) and performing graph queries can be desirable under certain circumstances. For example, graph storage can be desirable where a business application or its underlying data involve complex many-to-many relationships, or anytime there is a need to analyze the relationships that underlie the data (i.e., where the relationships between data points matter as much or more than the data points themselves). In these situations, graph storage and query capabilities can be useful since a graph database system typically allows one to more easily express certain types of queries. For example, pattern matching, multi-hop navigation, transitive closure and polymorphic queries are typically easier to express with a graph query.

Increasingly, relational database systems are being leveraged to perform the functions of a graph database system. In particular, the nodes and edges that comprise a graph may be stored in ordinary relational tables referred to as node and edge tables. Node tables store information or references relevant to a particular node (e.g., employee), and an edge table reflects the relationship (e.g., co-worker) between nodes in the node table. Such use of a relational database system can, however, uncover certain problems.

For example, executing a shortest path graph query on a relational database requires recursively joining multiple tables repeatedly, where each sequence of joins represents one path expansion. Relational database systems are often not natively capable of performing such a query. To perform such a query, a user may be forced to custom craft a query using conditional branching and temporary storage that can come with significant performance problems. Likewise, writing such conditional logic is error prone and requires new code for each new query. Alternatively, recursive common table expressions ("CTEs") may be employed to handle at least the recursive portions of a custom query, though these suffer from performance issues. Moreover, the recursive member of a CTE will typically recurse until no rows are returned meaning early termination may be difficult.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer-readable memory devices are provided that address issues related to efficient execution of graph queries, and other types of queries, in a relational database system by providing a multi-step sequence query plan operator. In one aspect, a database application is configured to accept and process a query to generate a query plan including a multi-step sequence, wherein the multi-step sequence includes at least an initial step configured to execute and pass execution control to another step, at least an intermediate step configured to execute and pass execution control to another step, and a final step configured to execute to provide a sub-query result based on the execution results of the aforementioned steps of the multi-step sequence. In an aspect, the sub-query result forms at least a partial basis of the results of the received query. The intermediate step may comprise a recursive step configured to generate recursive step results and pass such results back to itself via recursion unless or until an early termination condition is satisfied.

In an aspect, the relational database application may further generate one or more additional multi-step sequences for the query plan, and determine which multi-step sequence to execute. The relational database application may determine which multi-step sequence to execute based at least in part on: a step result of another step of the query plan, an intermediate query result of any other multi-step sequence in the query plan, and/or the inclusion of an optional parameter included in the query.

In another aspect, a multi-step sequence of a query plan may include steps configured to communicate arbitrary data to one or more other execution steps in the same, or a different, multi-step sequence of the query plan. A multi-step sequence in a query plan may also include multiple sub-plans that when executed, each generate respective sub-plan results, and wherein a sub-plan result for a first sub-plan may be incorporated into another sub-plan, and at least in part form the basis of the sub-plan result of that sub-plan. Furthermore, the sub-plan result for the first sub-plan may be re-used by other sub-plans or steps without requiring re-execution of the first sub-plan.

Further features and advantages of embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 4 shows an example graph query that may be submitted to, and processed by, example embodiments.

FIG. 5 shows a table illustrating possible traversal paths through the nodes of graph of FIG. 1 according to various constraints.

FIG. 8 shows a query including a repeated MATCH expression, and a conceptual effective query generated by transformation of the query, according to an embodiment.

FIG. 13 shows a flowchart of an alternative method for determining which of the first and second multi-step sequences to execute, according to an example embodiment.

FIG. 14 shows a flowchart of a method for processing a query by generating a query plan that includes a multi-step sequence including steps configured to communicate data to one or more other steps of the query plan, according to an example embodiment.

FIG. 15 shows a flowchart of method for processing a query by generating a query plan that further includes a first and second sub-plans each configured to generate sub-plan results, and wherein the second sub-plan re-uses the sub-plan results of the first sub-plan during subsequent executions, according to an example embodiment.

FIG. 16 shows a flowchart of a method for processing a query by re-generating a portion of a query plan during execution of the query plan.

Figures 1, 2, 3:
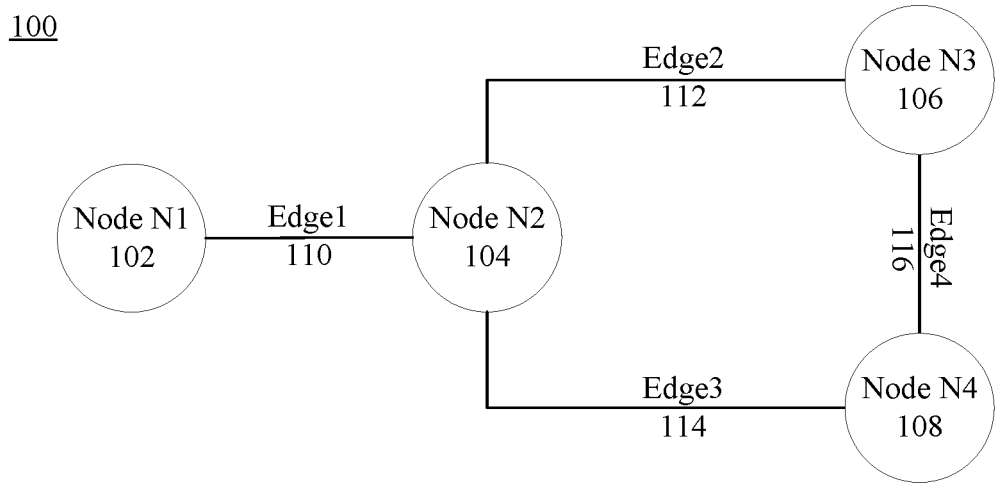
FIG. 1 shows an example graph reflecting co-worker relationships (edges) between workers (nodes).
FIG. 2 shows an example relational database node table that describes properties associated with the nodes shown in the graph of FIG. 1.
FIG. 3 shows an example relational database edge table that describes how the nodes shown in FIG. 1 and reflected in the node table of FIG. 2, are connected.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the disclosed embodiments. The scope of the embodiments is not limited only to the aspects disclosed herein. The disclosed embodiments merely exemplify the intended scope, and modified versions of the disclosed embodiments are also encompassed. Embodiments are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Embodiments will now be generally described with respect to performing a type of graph query against graph data stored as node and edge tables in a relational database. In particular, embodiments will be described in terms of generating a query plan to perform recursive shortest path traversal of graph. It should be understood, however, that embodiments are not limited to performing graph queries or recursive queries as will be discussed in more detail below. Embodiments are now described with reference to FIG. 1.

FIG. 1 shows an example graph 100 reflecting co-worker relationships (edges) between workers (nodes). Graph 100 of FIG. 1 includes nodes N1-N4 enumerated with reference numerals 102-108, respectively. Graph 100 also includes edge1-edge4 enumerated with reference numerals 110-116, respectively. As described briefly above, nodes N1 102 through N4 108 represent workers at a company. Edge1 110 through edge4 116, on the other hand, represent relationships between the workers. In this example, edges represent a "working with" relationship. That is, nodes connected by edges are workers that have a co-worker relationship (i.e., they work with one another). Graph 100 of FIG. 1 is merely a conceptual visualization tool. Data that embodies graph 100 must be stored differently than what is illustrated in graph 100 of FIG. 1.

For example, FIG. 2 illustrates an example relational database node table 200 that describes properties associated with the nodes shown in the graph of FIG. 1. Node table 200 is stored in a relational database as a table, and in this example is named "Employees." Node table 200 includes three columns that store information related to each node. In particular, each row of node table 200 includes a NodeID, Employee Name and Role. The EmployeeName for at each node simply reflects the name of that employee. In graph 100 of FIG. 1, the EmployeeName included in each node (i.e., row of the table) is merely shorthand. In an actual graph that reflects actual production data, one may expect to see the actual names of people.

Each node of node table 200 also includes a Role for that particular employee. For example, the employees illustrated by nodes in graph 100, and embodied in node table 200, may be an Architect as shown at node N1 102 or N3 106, a receptionist as shown at node N2 104, or a PM (i.e., "Program Manager") as shown at node N4 108. Each node included in node table 200 also includes a NodeID that uniquely identifies each node and, as described below, also serves to identify the nodes connected by the edges of edge table 300 of FIG. 3.

Edge table 300 of FIG. 3 may likewise be stored in the relational database along with node table 200. In this example, edge table 300 is named "WorkingWith." Edge table 300 includes three columns to define each edge. The columns are: Edge ID, FromNode and ToNode. Each row corresponds to an edge of graph 100. The edgeID in each row uniquely identifies each edge. The FromNode of each row includes the NodeID of one of the nodes connected by that edge, and the ToNode includes the NodeID of the other node connected by the edge. Note, in this example, the node table reflects a "to" and "from" relationship (i.e. a directed graph). It should be understood, however, that embodiments are enabled to function with any type of graph, directed or otherwise.

Taking node table 200 and edge table 300 together, and with reference to FIG. 1, one can see that these tables reflect the nodes of graph 100, and the edges serving to interconnect such nodes. In embodiments, after node table 200 and edge table 300 have been created and persisted to the relational database system, a user may seek to execute graph queries against the data.

For example, FIG. 4 shows an example graph query 400 that may be submitted to, and processed by, example embodiments. FIG. 4 is described as follows with respect to FIG. 5. FIG. 5 shows a table 500 illustrating possible traversal paths through the nodes of graph of FIG. 1 according to various constraints. The discussion immediately below of FIGS. 4 and 5 serve to generally describe query 400 and the type of data such a query may return, in embodiments. Details of other embodiments describing processing of query 400 to generate a physical query plan will be discussed in greater detail further below.

Query 400 of FIG. 4 is an example Transact-SQL ("T-SQL") graph query, according to an embodiment. Query 400 comprises one statement including three clauses: SELECT clause 402, FROM clause 403 and WHERE clause 404. Query 400 operates as an implicit JOIN of the Employees table, the WorkingWith table, and again the Employees table, with the results filtered by WHERE clause 404. Note, since the query is computing a recursive result, embodiments must take FROM clause 403 and WHERE clause 404 (including the recursive MATCH predicate 406 discussed below) together to compute the results rather than strictly computing a cartesian product.

WHERE clause 404 includes 3 conditions or predicates 406, 408, and 410. Predicate 406 specifies a recursive MATCH condition that will include only the shortest path between starting node n1 and ending node n2, wherein nodes n1 and n2 satisfy predicates 408 and 410, respectively. Predicate 408 requires that the Role of each matching start node be equal to 'Architect.' Similarly, Predicate 410 requires that the Role of each matching ending node be equal to 'PM.' The query result of query 400 is then generated by applying the conditions of WHERE clause 404 to the results of SELECT statement 402. In particular, the query result will return the shortest path between every Architect and every Program Manager as shown in graph 100 of FIG. 1, and as embodied by node table 200 and edge table 300.

The query result of query 400 may be better understood by considering FIG. 5. Table 500 of FIG. 5 illustrates the possible traversals paths through the nodes of graph 100 of FIG. 1 according to various constraints. Table 500 includes three columns including: all paths 502, all paths between Architects and Program Managers 504 and shortest path between all Architects and Program Managers 506. The paths illustrated in table 500 of FIG. 5 assume that no node can be traversed more than once. It should be understood, however, that no particular traversal restrictions or rules are required nor assumed. For instance, one could create a similar table of traversals assuming that no edge may be traversed more than once, or where loops/cycles are allowed up to some maximum path length.

The first column of table 500 illustrates all possible traversal paths through graph 100 from each node to all other nodes through all paths. For example, consider the upper left quadrant of column 502, with reference to graph 100 of FIG. 1, in which 5 paths are illustrated starting at node N1 102 of graph 100, and ending at each of the other nodes N2-N4. In particular, paths include: N1 to N2, N1 to N2 to N3, N1 to N2 to N3 to N4, N1 to N2 to N4, and N1 to N2 to N4 to N3. It can be shown that this is an exhaustive list of possible traversal paths from N1 to the other nodes N2-N4 (and where cycles or loops where a node is traversed more than once are not permitted in any path). The paths from N2, N3 and N4 to all of the other nodes are illustrated in the upper-right, lower-left and lower-right quadrants, respectively, of the column 502 of table 500. This exhaustive list of traversal paths is provided only for the sake of context and completeness since, for example, the traversal of graph 100 required to evaluate query 400 would typically not start on any nodes other than architects (i.e., N1 and N3). In embodiments, however, bidirectional traversal may be performed whereby graph 100 is traversed in both directions starting with both architects and Program Managers (but no other nodes), and working until the traversals meet in the middle.

Now consider column 504 of table 500, wherein constraints are placed on traversal paths. In particular, column 504 illustrates traversal paths of graph 100 of FIG. 1 where start nodes are restricted to Architects, and end nodes are restricted to Program Managers. As shown in node table 200 of FIG. 2, only one employee has the Role of PM corresponding to node N4 108. Accordingly, all paths in column 504 must end on N4. Similarly, only N1 and N3 of graph 100 correspond to employees with the Role of Architect, which then requires that the paths of column 504 must always start on either nodes N1 or N3. As is apparent, the paths of column 504 are an exhaustive list of such paths.

Finally, consider column 506 of table 500 wherein an additional constraint is imposed on otherwise valid traversal paths shown in column 504. In particular, the paths shown in column 506 satisfy not only the conditions required to produce the paths in column 504, but also constitute the shortest paths (as measured by the number of hops since the edges in this case all have equal weights) between all architects and all program managers. Thus, there is only one path between N1 and N4, and between N3 and N4, and these paths are the shortest paths between the respective endpoints. The paths shown in column 506 are based on the rows returned by query 400 of FIG. 4.

Figure 6:
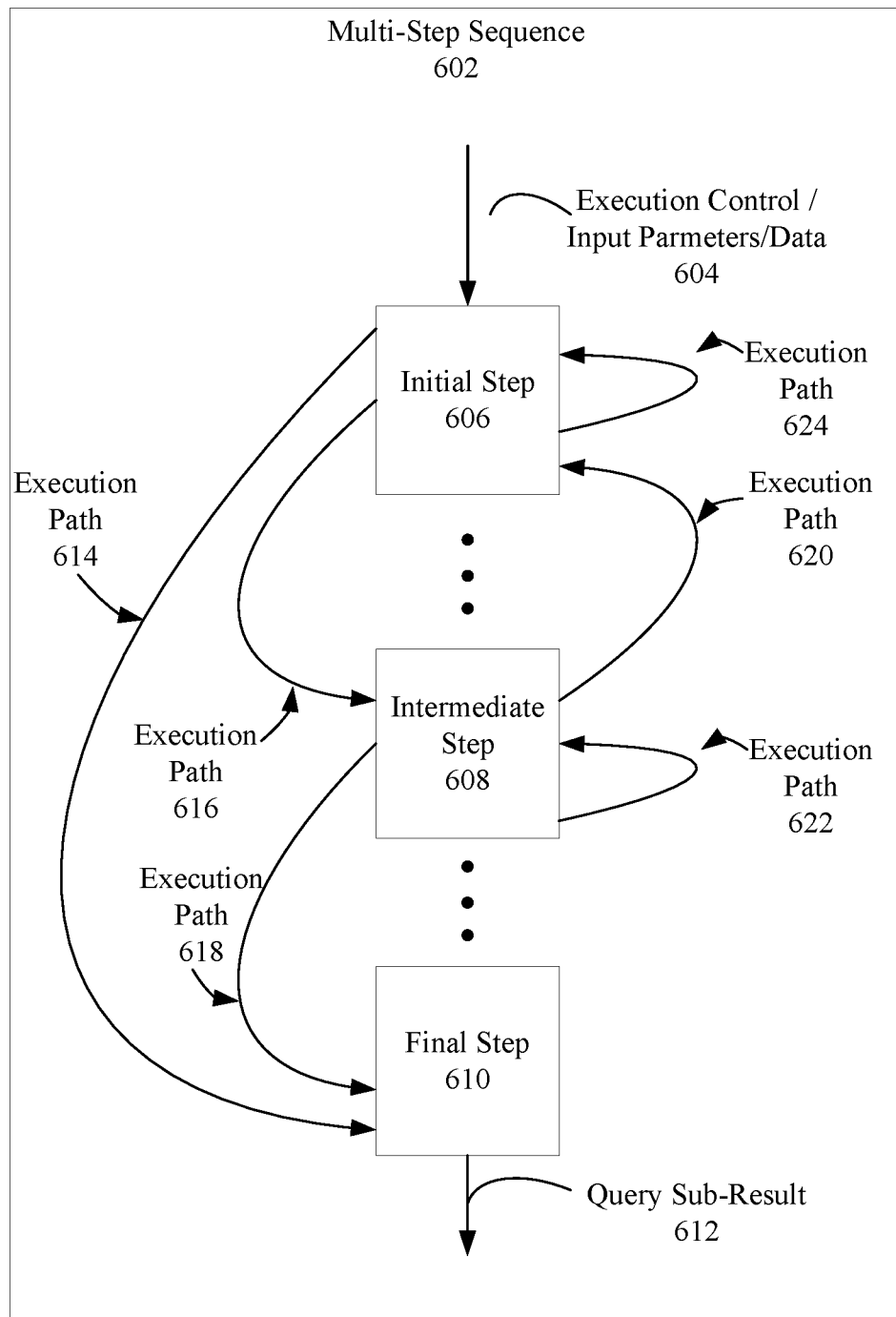
FIG. 6 shows an example multi-step sequence, according to an embodiment.

Although it may be noted that the ordering of the paths as shown in table 500 of FIG. 5 implies a depth-first traversal of graph 100, it should be understood that embodiments are not restricted to any particular traversal algorithm. Indeed, as understood in the art, the algorithm employed to perform traversal may vary depending on the type of graph (e.g. weighted edges, negative edge weights) and/or particular type of shortest path problem being solved. In embodiments, shortest path algorithms may include Dijkstra's, Bellman-Ford, A* search, Floyd-Warshall, Johnson's, Vitterbi, and other algorithms as known in the art. Embodiments may implement recursive versions of one or more of these algorithms to perform the shortest path traversal necessary to perform query 100, and may do so in various ways. For instance, FIG. 6 shows an example multi-step sequence 602 that may be included in a physical query plan for performing graph queries, and other types of queries, according to an example embodiment. Other structural and operational embodiments will be apparent to persons skilled in the relevant art(s) based on the following discussion regarding multi-step sequence 602.

Figure 7:
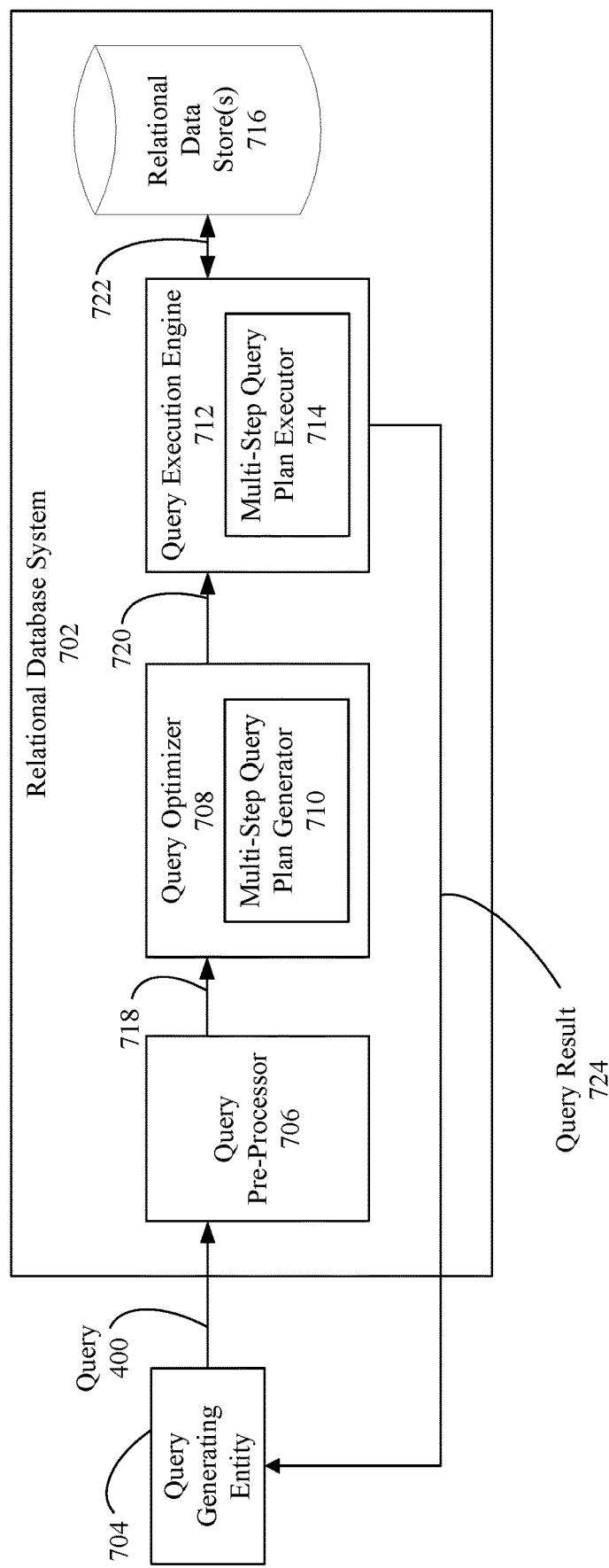
FIG. 7 shows a block diagram of an example relational database system that includes a multi-step query plan generator and multi-step query plan executor configured to generate and execute, respectively, a query plan including a multi-step sequence, according to an embodiment.

In an embodiment, multi-step sequence 602 is a type of logical and physical sequence operator that may be included in a query plan. Multi-step sequence 602 as depicted in FIG. 6 includes an initial step 606, an intermediate step 608, and a final step 610. Although multi-step sequence 602 is depicted in FIG. 6 as having three steps, such a configuration is illustrated as a typical example, and other embodiments of a multi-step sequence may include fewer steps or greater numbers of execution steps. Moreover, a multi-step sequence may include more than one final step, with the particular final step to execute being left as a runtime decision. Note that a multi-step sequence may also be a single step that is repeated one or more times. Further embodiments are directed to just a single step being present. Each of step 606 and 608 may be configured to pass execution control to one or more other steps of multi-step sequence 602 via one or more execution paths 614-624. Final step 610 is configured to pass execution control and query sub-result 612 back to a query execution component such as multi-step query plan executor 714 of query execution engine 712 as depicted in FIG. 7, and as will be discussed in greater detail herein below. Embodiments of multi-step sequence 602, including functional aspects enabled by multi-step sequence 602, will now generally be described. Such embodiments will be described in terms of steps 606, 608 and 610. It should be understood, however, that embodiments of multi-step sequence 602 are not limited to multi-step sequences containing only these particular steps or types of steps. Embodiments are now described with reference to FIG. 6.

In embodiments, multi-step sequence 602 of FIG. 6 may be understood by regarding instances of multi-step sequence 602 as an ordinary sequence operator, but with relaxed execution constraints and expanded inter-step communication capabilities. An ordinary sequence operator typically drives wide update plans, and executes each child of the sequence in a purely sequential order, first to last. Each child of such a sequence typically updates a different object, and returns only those rows generated by the last child of the sequence.

A multi-step sequence such as multi-step sequence 602, on the other hand, is a more flexible sequence operator with a number of different capabilities. For example, embodiments of multi-step sequence 602, when included in an executable physical query plan, may enable one or more of the following capabilities depending on the particulars of the generated multi-step sequence:

sub-division of a query plan into separate steps that may be executed in an arbitrary order, and may be repeated to permit flexible, performant recursive execution;
communication of arbitrary data including full or partial result sets between steps;
multiple alternative plans for one or more steps, with execution choice between plans deferred until execution (e.g., serial plan vs parallel plan depending on cardinality determined during execution);
adaptation between steps including: parallelism, adaptive memory grants to account for over or underestimation of memory needs, cardinality estimates; and
applicability to a number of applications including: interleaved execution, parameter sensitive plans, and/or bidirectional execution.

In an embodiment, initial step 606, intermediate step 608 and final step 610 of multi-step sequence 602 may each comprise a single physical or logical SQL query operator. In other embodiments, however, steps of multi-step sequence 602 may comprise one or more physical or logical SQL query operators. In an embodiment, physical operators may include any type of physical operator, such as for example, hash match, table insert, merge join, nested loops, index insert, non-clustered index update, parallelism, sort, split, stream aggregate, table scan and other types of SQL physical operators as may be known in the art. In embodiments, logical query operators may include, for example, branch and segment repartition, various join operators, distinct and distinct sort, partial aggregate, union and other types of SQL logical operators as known in the art.

When a query plan that includes an instance of multi-step sequence 602 is executed, initial step 606 of multi-step sequence 602 is the first step of the multi-step sequence to be executed. In an embodiment, initial step 606 is configured to execute to generate initial step results, and then pass execution control to a different step or to itself. In some embodiments, however, depending on the step results generated by initial step 606, execution control may pass to any other step including intermediate step 608 by passing execution control via execution path 616. Likewise, initial step 606 may pass execution control to final step 610 via execution path 618. Alternatively, initial step 606 may pass execution control to any other steps that may be included in multi-step sequence 602 (including final step 610, the step that determines execution should terminate), and as represented by the sets of vertical ellipses depicted in FIG. 6 (execution paths not shown). For the purposes of describing embodiments of multi-step sequence 602, we herein assume that initial step 606 passes execution control to intermediate step 608 via execution path 616.

In embodiments, intermediate step 608 of multi-step sequence 602 in FIG. 6 may be configured to receive execution control from a previously executed step of multi-step sequence 602. After receiving execution control, embodiments that include intermediate step 608 may be configured to execute to generate intermediate step results, and thereafter pass execution control to any other step in multi-step sequence 602, including intermediate step 608 itself. Embodiments may include a number of useful features that are enabled by permitting multi-step sequence steps such as intermediate step 608 to execute itself. For example, recursive queries such a recursive shortest path graph queries, as discussed above, may be implemented in a simple manner without requiring the user to custom craft recursive queries or recursive CTEs, and also thereby avoid the performance problems associated with those solutions, in embodiments. Additionally, by permitting intermediate step 608 (as well as other instances of intermediate steps like intermediate step 608) to pass execution control to any other step in multi-step sequence 602, multi-step sequence 602 is enabled in embodiments to execute steps in arbitrary order, to execute alternative sub-plans according to actual step results determined at runtime, to adapt to the memory or performance needs of the query depending on cardinality estimates computed at run time, and to enable other features as discussed above.

After executing to generate intermediate step results, intermediate step 608 may pass execution control to any other step of multi-step sequence 602. Intermediate step 608 may run only a single time to generate intermediate step results, and thereafter pass execution control to another step. Likewise, even where intermediate step 608 is being executed recursively (i.e., by repeatedly executing itself to operate on results generated by the previous iteration), typically a termination condition or recursion depth limit will eventually be reached, and intermediate step 608 will pass execution control to some other step. Note, in other embodiments, a step could execute repeatedly without terminating (i.e. an infinite loop). For the purposes of describing embodiments of multi-step sequence 602, we herein assume that intermediate step 608 passes execution control to final step 610 via execution path 618.

In embodiments, final step 610 of multi-step sequence 602 in FIG. 6 may be configured to receive execution control from any previously executed step of multi-step sequence 602, including from intermediate step 608 via execution path 618. Final step 610 of multi-step sequence 602 is configured to be the final execution step in multi-step sequence 602. In embodiments, final step 610 is configured to generate query sub-result 612 comprising the results for the entire execution of multi-step sequence 602. In embodiments, query sub-result 612 may be based in part on any prior step results generated by steps of multi-step sequence 602. After receiving execution control and generating query sub-result 612, embodiments of multi-step sequence 602 are enabled to pass query sub-result 612 and execution control to any other query operator, step, step sequence or multi-step sequence, or back to query execution engine (e.g., multi-step query plan executor 714 of query execution engine 712 of FIG. 7, as will be discussed in further detail below). Embodiments may generate and incorporate instances of multi-step sequence 602 in a query plan for performing query 100, and may do so in various ways.

For instance, FIG. 7 shows a block diagram of an example relational database system 702 that includes a multi-step query plan generator 710 configured to generate a query including a multi-step sequence 602, according to an example embodiment. Other structural and operational embodiments will be apparent to persons skilled in the relevant art(s) based on the following discussion regarding relational database system 702.

Relational database system 702 includes query pre-processor 706, query optimizer 708, query execution engine 712 and relational data store(s) 716. Query optimizer 708 includes multi-step query plan generator 710. Query execution engine 712 includes multi-step query plan executor 714. Query pre-processor 706 is coupled to query generating entity 704. These features of relational database system 702 are described as follows.

In embodiments, query pre-processor 706 of relational database system 702 as shown in FIG. 7 is configured to accept query 400 from query generating entity 704. Relational database system 702 is described as follows for illustrative purposes with respect to a received query being query 400 of FIG. 4, but other queries may be received and processed by system 702 in embodiments. Query generating entity 704 may provide query 400 local to relational database system 702 (e.g., from a terminal or Microsoft SQL Server Management Studio), or remotely via a network such as, for example, the Internet. A network may, however, comprise one or more networks such as local area networks (LANs), wide area networks (WANs), enterprise networks, and may include one or more of wired and/or wireless portions. Examples of computing devices that may be used to provide queries to relational database system 702 include, for example and without limitation, desktop computers, laptop computers, tablet computers, netbooks, smartphones, wearable computing devices, etc.

Although relational database system 702 is depicted as a monolithic component, relational database system 702 may be implemented as any number of computing devices including servers, and may include any type and number of other resources, including resources that facilitate communications with and between computing devices connected via networks as described above. In embodiments, servers implementing relational database system 702 may be organized in any manner, including being grouped in server racks (e.g., 8-40 servers per rack, referred to as nodes or "blade servers"), server clusters (e.g., 2-64 servers, 4-8 racks, etc.), or datacenters (e.g., thousands of servers, hundreds of racks, dozens of clusters, etc.). In an embodiment, servers that comprise relational database system 702 may be co-located (e.g., housed in one or more nearby buildings with associated components such as backup power supplies, redundant data communications, environmental controls, etc.) to form a datacenter, or may be arranged in other manners. Accordingly, in an embodiment, relational database system 702 may comprise a datacenter in a distributed collection of datacenters.

As shown in FIG. 7, query pre-processor 706 is configured to receive query 400 submitted by query-generating entity 704 and to perform certain operations thereon to generate a representation of the query that is suitable for further processing by query optimizer 708. Such operations may include, but are not limited to, parser and algebrizer operations performed by parser and algebrizer components (not shown for ease of illustration). In an embodiment, query pre-processor 706 outputs query processor tree 718 that is a logical representation of query 400. In an embodiment, query processor tree 718 may be obtained by translating the original text of query 400 into a tree structure with leaf nodes representing table accesses and internal nodes representing relational operators such as relational join. Query optimizer 708 is configured to receive query processor tree 718 output by query pre-processor 706, and to process query processor tree 718 to generate query plan 720 for the query. Embodiments of relational database system 702, and multi-step query plan generator 710 of query optimizer 708 in particular, will now generally be described. Such embodiments will be described in terms of processing query 400 of FIG. 4 to generate query plan 720 including an instance of multi-step sequence 602 of FIG. 6 for performing query 400. It should be understood, however, that embodiments of relational database system 702 are not strictly limited to multi-step sequences as illustrated in FIG. 6. Embodiments are now described with reference to FIGS. 4 and 6.

For convenience, query 400 is reproduced herein below:

```
SELECT * FROM Employees n1, WorkingWith e1, Employees n2
WHERE MATCH(shortest_path(n1(-(e1)->n2)+) and
    n1.Role = 'Architect' and
    n2.Role = 'PM'
```

Generating query plan 720 to perform query 400 begins in query pre-processor 706, wherein the text of T-SQL query 400 is parsed to determine, in part, whether query 400 includes a repeated MATCH expression. For example, query 400 includes a repeated MATCH expression as follows:

MATCH(shortest_path(n1(-(e1)→n2)+).

In embodiments, when the parser encounters the repeated MATCH expression in the query, the query is marked to indicate a recursive multi-step sequence should be used to generate query plan 720.

When an incoming query requires a recursive multi-step sequence, such as with query 400, query pre-processor 706 of relational database system 702 is configured to perform the initial transformations of query 400 into the query sections necessary to generate the recursive multi-step sequence incorporated into query plan 720, in one embodiment. In particular, each repeated MATCH expression must be mapped onto an anchor member, a recursive member, and the outer SELECT query that expressly references the recursive member in a manner analogous to a recursive CTE.

Embodiments of query pre-processor 706 may also be configured to expand a repeated MATCH expression in both the left-to-right and right-to-left directions where embodiments allow queries to execute repeated MATCH expressions in either direction, e.g.:

MATCH(shortest_path(n1(-(e1)→n2←(e2)–n3)+)).

In embodiments, the abovementioned transformations and expansions may be performed by query pre-processor 706 of relational database system 702 in part to produce query processor tree 718 as provided to query optimizer 708. Embodiments of query optimizer 708 may be configured to generate query plan 720 using multi-step query plan generator 710 when query optimizer 708 determines that query plan 720 ought to include an instance of multi-step sequence 602. For example, and as discussed above, parser functionality of query pre-processor 706 may include a flag in query processor tree 718 as provided to query optimizer 708, and that indicates particular processing is required for evaluating query 400. Query optimizer 708 may thereafter detect the flag in query processor tree 718, and direct multi-step query plan generator 710 to create a recursive multi-step sequence for inclusion in query plan 720, in an embodiment.

As discussed above, embodiments of query pre-processor 706 may be configured to perform the initial transformations of, for example, query 802 to expand the repeated MATCH section of query 802 into at least an anchor member, recursive member and outer select query. For example, consider FIG. 8. FIG. 8 shows a query 802 including a repeated MATCH expression, and a conceptual effective query generated by transformation of the query, according to an embodiment. Query 802 of FIG. 8 is reproduced for convenience herein below:

```
SELECT * FROM n1, n2, n3, e1, e2
WHERE MATCH(shortest_path(n1(-(e1)->n2-(e2)->n3)+))
```

Effective query 804 of FIG. 8 shows a conceptual expansion of query 802 and its repeated match predicate (i.e., "match(shortest_path(n1(-(e1)→n2-(e2)→n3)+)) into an equivalent anchor member 808, recursive member 810 and outer select query 812. It should be understood that effective query 804 represents a non-physical, conceptual transformation, and does not represent the query from which query plan 720 is generated.

Figure 9:
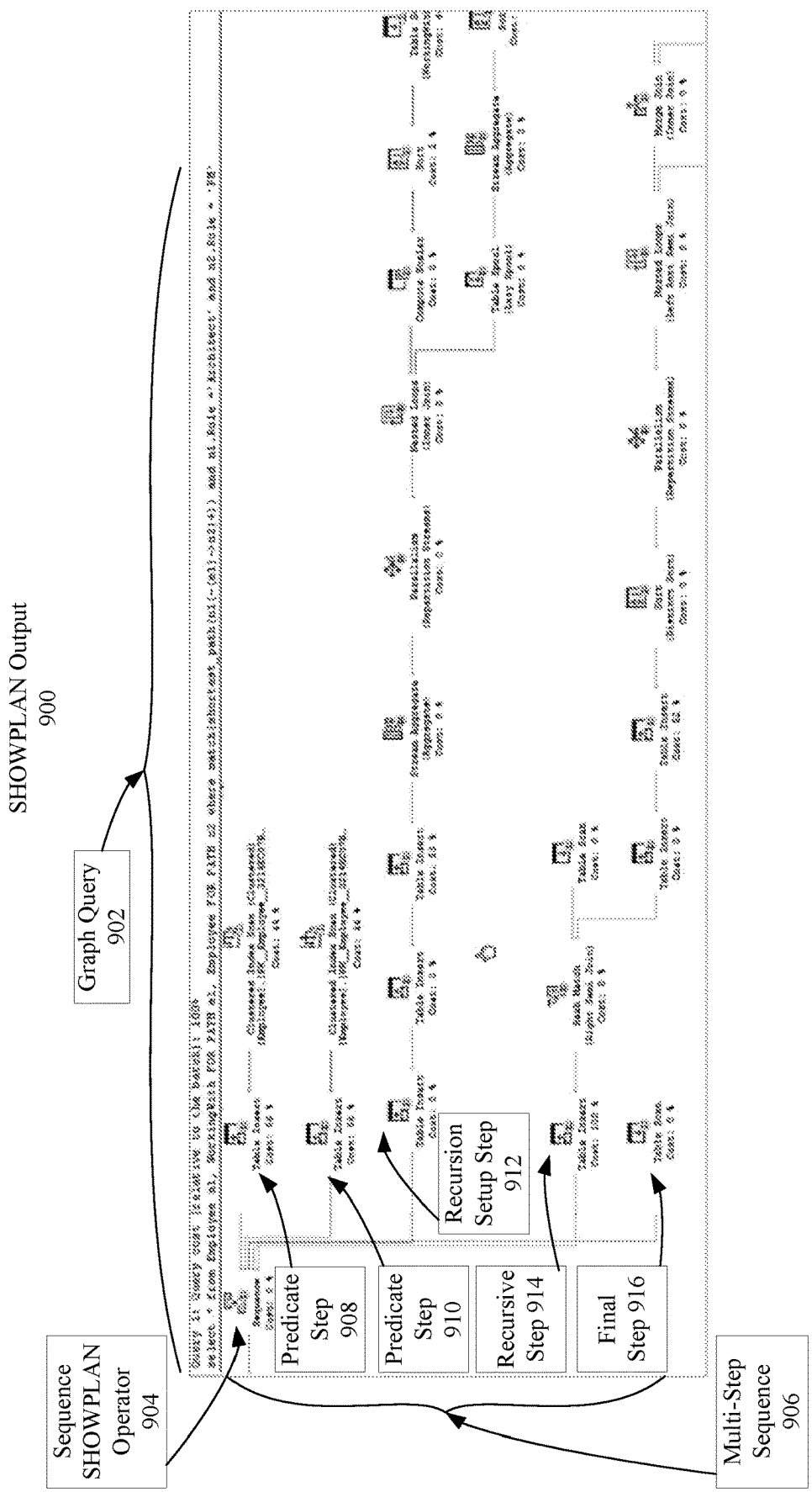
FIG. 9 shows a portion of the SHOWPLAN output of a query plan that includes a multi-step sequence, as generated for an example graph query by an embodiment.

In embodiments, relational database system 702 of FIG. 7 may use query pre-processor, query optimizer 708, multi-step query plan generator 710, query execution engine 712, and multi-step query plan executor 714 in various ways to generate a query plan that includes a multi-step sequence, and such sequences may likewise comprise various logical and physical plan operators, as discussed above. For instance, FIG. 9 shows a portion of the SHOWPLAN output 900 of a query plan that includes a multi-step sequence 906, as generated for an example graph query by an embodiment. Multi-step sequence 906 as shown in SHOWPLAN output 900 is excerpted from a physical query plan generated by an embodiment of relational database system 702, and comprises various logical and physical plan operators. SHOWPLAN output 900 of FIG. 9 is now described with reference to query 400 of FIG. 4, and multi-step sequence 602 of FIG. 6.

Graph query 902 is virtually identical to query 400 of FIG. 4, except that graph query 902 includes FOR PATH expressions. In an embodiment, the FOR PATH option operates to mark the associated alias for later validation. In particular, any alias proceeded by the FOR PATH option must be used in a repeated MATCH expression in the query. Accordingly, the respective query plans created for these queries will be the same, and all discussion of query 400 herein applies equally to graph query 902 of FIG. 9, and all further discussion of SHOWPLAN output 900 with instead reference query 400 and FIG. 4.

Multi-step sequence 906 is one example of multi-step sequence 602 of FIG. 6 as discussed in detail above. In SHOWPLAN output 900, multi-step sequence 906 is represented by Sequence SHOWPLAN operator 904. As discussed above, a multi-step sequence may be regarded as a special type of sequence, and although sequence SHOWPLAN operator 904 is labeled "Sequence", it nevertheless operates as a multi-step sequence as detailed in more detail below.

As detailed above, and shown in FIG. 6, embodiments of a multi-step sequence include at least an initial step, an intermediate step, and a final step. Multi-step sequence 904 includes five steps: predicate step 908, predicate step 910, recursion setup step 912, recursive step 914 and final step 916. In multi-step sequence 904, predicate step 908 serves as the first step. Each of predicate step 910, recursion setup step 912 and recursive step 914 is an intermediate step. Final step 916 comprises the final step of multi-step sequence 904. Each of these steps will be discussed with reference to FIG. 4 and query 400 as reproduced herein below for convenience:

```
SELECT * FROM
    Employee n1,
    Working With e1,
    Employee n2
WHERE MATCH(shortest_path(n1(-(e1)->n2)+) and
    n1.Role = 'Architect' and
    n2.Role = 'PM'
```

Predicate step 908 and predicate step 910 of FIG. 9 perform query operations related to predicate 408 and predicate 410, respectively. Predicate step 908 finds all the start nodes for the shortest path traversal of graph 100. More specifically, predicate step 908 finds all rows in the Employee table where 'Role' equals 'Architect', and stores those rows in a temporary table. Similarly, predicate step 910 finds all the ending nodes for the shortest path traversal graph 110. More specifically, predicate step 910 finds all rows in the Employee table where 'Role' equals 'PM', and stores those rows in a temporary table. Although predicate step 908 is the first step of multi-step sequence 906, predicate step 910 could just as easily serve as the initial step since these operations are independent of one another. Likewise, and for the same reason, predicate step 908 and predicate step 910 could execute simultaneously, in embodiments. In any event, which ever of predicate step 908 and predicate step 910 executes second, that step would be regarded as an intermediate step.

Recursion setup step 912 is likewise an intermediate step. Recursion setup step 912 is the start of the path traversal. Recursion setup step 912 finds all of the nodes one hop away from each of starting nodes. More specifically, recursion setup step 912 retrieves the results stored in the temporary table by predicate step 908, determines which rows are one hop away from each of those nodes, and stores those results in a temporary table. Referring to graph 100 of FIG. 1, and node table 200 of FIG. 2, it can be seen that nodes N1 and N3 are the start nodes as determined by predicate step 908, and recursion setup step 912 will determine that node N2 as the only node one hop away from node N1 and nodes N2 and N4 as the nodes one hop away from N3. After recursion setup step 912 stores these results in the temporary table, and execution control is passed to a recursive step 914.

Recursive step 914 is configured to recursively traverse the nodes of graph 100, to determine the shortest paths between every architect and every PM. More specifically, recursive step 914 starts with the results of recursion setup step 912 (i.e., the nodes that are one hop away from the start nodes), and determines the nodes that are one hop away from those nodes, and proceeds by executing recursive step 914 recursively to find all the nodes at the next level, until no more nodes are found. Alternatively, and when traversing in a breadth first manner, it is possible to terminate recursion when a path is discovered and/or where all possible results have been found. During each iteration of recursive step 914, the nodes found are stored in a temporary table, and at the end of the recursion, the temporary table will contain the entire result set.

Final step 916 retrieves the result set from the temporary table used by recursive step 914, and bubbles those results up through the remainder of the query plan (not shown).

Figure 10:
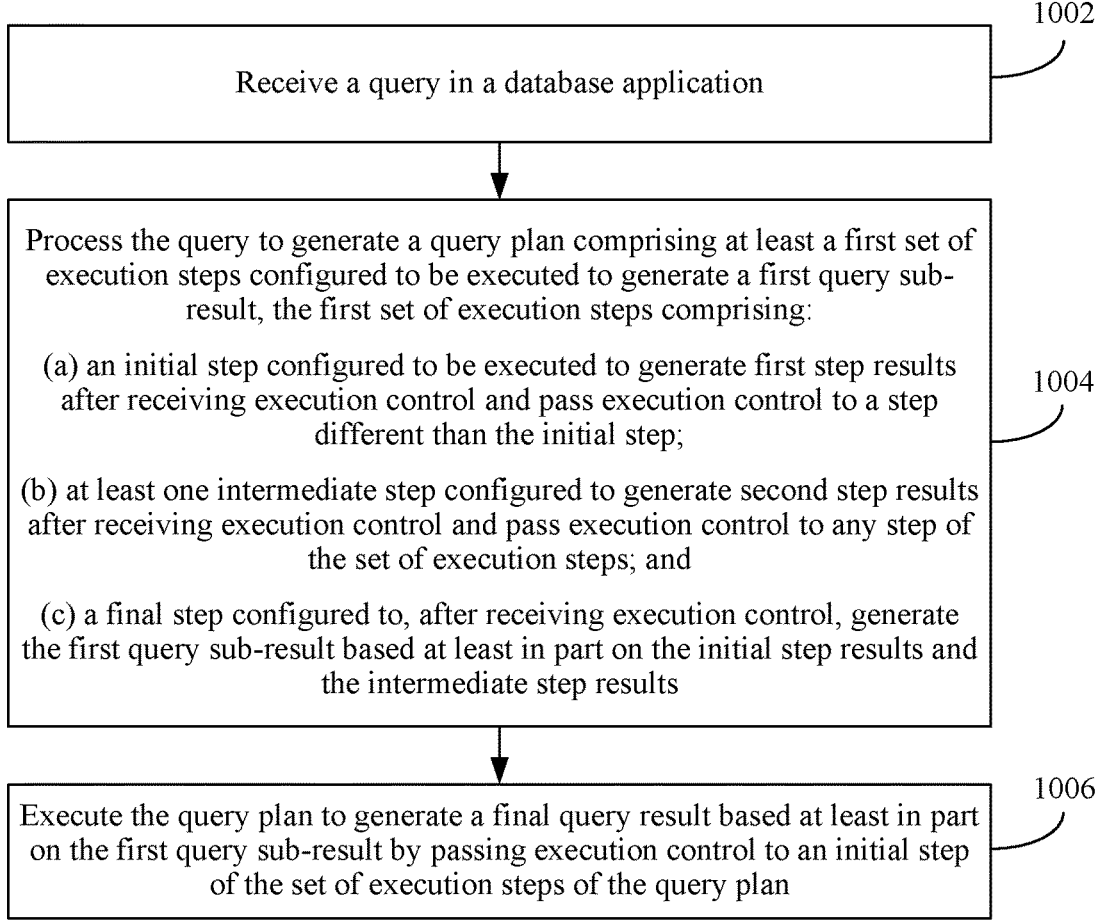
FIG. 10 shows a flowchart of a method for processing a query to generate and execute a physical query plan that includes a first multi-step sequence, according to an example embodiment.

In embodiments, relational database system 702 of FIG. 7 may be used in various ways to execute graph queries or other types of queries using a multi-step sequence. For instance, FIG. 10 shows a flowchart 1000 of a method for processing a query to generate and execute a physical query plan that includes a first multi-step sequence, according to an example embodiment of relational database system 702. Flowchart 1000 is described with continued reference to FIG. 7. However, other structural and operational embodiments will be apparent to persons skilled in the relevant art(s) based on the following discussion regarding flowchart 1000 and relational database system 702 of FIG. 7.

Flowchart 1000 begins with step 1002. In step 1002, a query is received in a database application. For example, in relational database system 702 of FIG. 7, query pre-processor 706 receives query 400 from query generating entity 704. As described above, query 400 may comprise, for example, a T-SQL query.

In step 1004, the query is processed to generate a query plan comprising at least a first set of execution steps configured to be executed to generate first query sub result, and wherein the first set of execution steps comprises a number of other steps as follows:

an initial step configured to be executed to generate first step results after receiving execution control and pass execution control to a step different than the initial step;

at least one intermediate step configured to generate second step results after receiving execution control and pass execution control to any step of the set of execution steps; and a final step configured to, after receiving execution control, generate the first query sub-result based at least in part on the initial step results and the intermediate step results.

For example, in relational database system 702 of FIG. 7, query preprocessor 706 may be configured to pre-process query 400 to generate query processor tree 718, which is received by query optimizer 708. Query optimizer 708, in conjunction with multi-step query plan generator 710, is configured to generate query plan 720 that includes an instance of multi-step sequence 602, all of which is described in detail above.

Flowchart 1000 continues at step 1006. At step 1006, the query plan is executed to generate a final query result based at least in part on the first query sub-result by passing execution control to the initial step of the set of execution steps of the query plan. For example, and as discussed above, query optimizer 708 of relational database system 702 is configured to pass query plan 720 to query execution engine 712. Query plan 720 includes an instance of multi-step sequence 602. For example, query plan 720 could include a multi-step sequence similar to multi-step sequence 906 of FIG. 9. In an embodiment, multi-step query plan executor 714 of query execution engine 712 may be configured to execute the query plan 720 by passing execution control to the first step in the query plan. The first step in the query plan may comprise, for example, initial step 606 of multi-step sequence 602 as shown in FIG. 6. Where, for example, multi-step sequence 602 operates like multi-step sequence 906 of FIG. 9, multi-step query plan executor 714 of query execution engine 712 would pass execution control to predicate step 908 of multi-step sequence 906 which serves as the initial step discussed above at step 1004.

Multi-step sequence 906 is executed to determine the starting nodes of graph traversal required to compute graph query 902, as discussed above in some detail. Such starting nodes are stored in a temporary table and comprise the first step results discussed above in relation to step 1004. After executing predicate step 908 of multi-step sequence 906, multi-step query plan executor 714 of query execution engine 712 is configured to pass execution control to an intermediate step as discussed above in relation to step 1004.

For example, multi-step query plan executor 714 of query execution engine 712 may pass execution control to predicate step 910 of multi-step sequence 906. After execution of predicate step 910 completes, multi-step query plan executor 714 of query execution engine 712 may and pass execution control to the next step of multi-step sequence 906, in this case, recursive setup step 912. Once execution of recursive setup step 912 has completed, execution control may be passed to recursive step 914.

As discussed above, recursive step 914 is configured to recursively traverse the underlying graph in the manner dictated by the specifics of query 400, and store the results in a temporary table. Final step 916 of multi-step sequence 906 is configured to generate the first query sub-result as discussed above in relation to step 1004. More specifically, final step 916 shall retrieve the final results determined at recursive step 914, and return such results as the first query sub-result. Through the foregoing description, the first query sub-result is based at least in part on the initial step results (i.e., the starting nodes of the traversal), and the intermediate step results (i.e., the results of the graph traversal).

After execution of multi-step sequence 906 has completed, query execution engine 912 may pass execution control to the next step in query plan 720, if any. It can be appreciated through this description, as well as the detailed description of at least FIG. 6 and FIG. 9 above, that the final query result generated at step 1006 must be based at least in part on the first query sub-result generated by, for example multi-step sequence 906.

In the foregoing discussion of steps 1002-1006 of flowchart 1000, it should also be understood that at times, such steps may be performed in a different order or even contemporaneously with other steps. For example, in embodiments, processing the query in step 1004 to generate execution steps of the query plan may proceed with different portions of such generation being performed in parallel.

As noted above, relational database system 702 of relational database system 702 of FIG. 7 may operate in various ways to process queries. For example, in an embodiment, query preprocessor 706, query optimizer 708, and multi-step query plan generator 710 may operate according to flowchart 1000, and optionally perform additional steps. For example, embodiments of relational database system 702 may operate according to any of FIGS. 11-16 while or after performing the method steps of flowchart 1000 as shown in FIG. 10.

Figure 11:
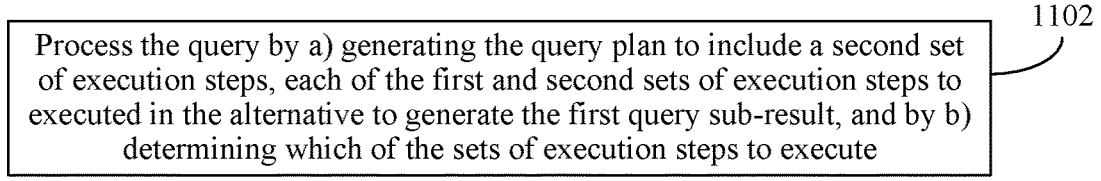
FIG. 11 shows a flowchart of a method for processing a query by generating a physical query plan that includes a second multi-step sequence, and for determining which of the first and second multi-step sequences to execute, according to an example embodiment.

FIG. 11 depicts a flowchart 1100 showing an example method for processing a query by generating a query plan that includes a second multi-step sequence, and determining which of the first and second multi-step sequences to execute, according to an example embodiment. Flowchart 1100 is described with reference to relational database system 702 of FIG. 7, although the method is not limited to that implementation. Other structural and operational embodiments will be apparent to persons skilled in the relevant art(s) based on the following discussion regarding flowchart 1100.

In step 1102 of flowchart 1100, the query plan is generated to include a second set of execution steps, each of the first and second sets of execution steps to be executed in the alternative to generate the first query sub-result, and processing the query includes determining which of the sets of execution steps to execute. For example, relational database system 702 of FIG. 7 may receive a query 400, that requires a query plan 720 with an additional multi-step sequence 602, and where each of the multi-step sequences may execute in the alternative. For example, it can be difficult to determine prior to runtime whether a given query ought to execute as a serial plan, or parallel plan. Multi-step query plan generator 710 of query optimizer 708 may be configured to detect such ambiguities, and generate query plan 720 to include both serial and parallel plans. Further, query plan 720 may be configured to further include steps that may determine at runtime which of the plans to execute.

Figure 12:
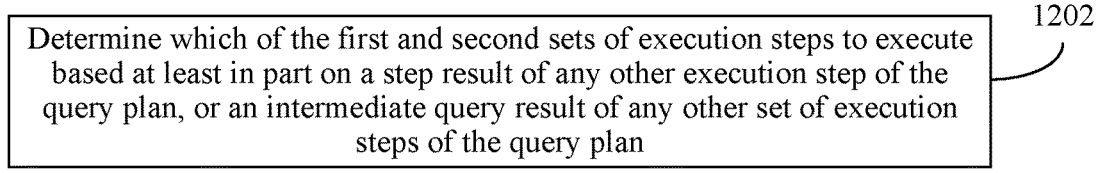
FIG. 12 shows a flowchart of a method for determining which of the first and second multi-step sequences to execute, according to an example embodiment.

FIG. 12 shows a flowchart 1200 of a method for determining which of the first and second sets of execution steps discussed in relation to FIG. 11 immediately above, should be executed. Flowchart 1200 begins at step 1202. At step 1202, it is determined which of the first and second sets of execution steps to execute at least in part on a step result of any other execution step of the query plan, or an intermediate query result of any other set of execution steps of the query plan. For example, query plan 720 generated by query optimizer 708 in conjunction with multi-step query plan generator 710 may include additional execution steps, or additional sets of execution steps (e.g., multi-step sequences), the results of which are used to determine which of the first and second multi-step sequences ought to be executed. Such steps or sets of execution steps may be configured, for example, to more precisely estimate or determine the cardinality of some portion of the query, and thereafter select the more performant set of execution steps. Embodiments may determine which of the first and second sets of execution steps should be executed in other ways. For example, consider flowchart 1300 of FIG. 13.

FIG. 13 shows a flowchart 1300 of an alternative method for determining which of the first and second sets of execution steps to execute, according to an example embodiment. Flowchart 1300 begins at step 1302. In step 1302, it is determined which of the first and second sets of execution steps to execute based at least in part on an optional parameter included in the query. For example, as may be known to persons skilled in the relevant art(s), parameters may be passed to a query through, for example, a stored procedure. In an embodiment of relational database system 702, query optimizer 708 and multi-step query plan generator 710 may work in conjunction to generate a query plan 720 including first and second sets of execution steps based at least in part on which parameters may be passed to the query via a stored procedure, and cache query plan 720 for later use. During the subsequent execution of the stored procedure, embodiments of relational database system 702 may use the parameter included in the invocation of the stored procedure to decide which of the first and second sets of execution steps should be executed.

Turning now to FIG. 14, FIG. 14 shows a flowchart 1400 of a method for processing a query by generating a physical query plan that includes a multi-step sequence including steps configured to communicate data to one or more other steps of the query plan, according to an example embodiment. As discussed above, embodiments of relational database system 702 may be configured to generate query plans using query optimizer 708 in conjunction with multi-step query plan generator 710 that include multi-step sequence such as, for example, multi-step sequence 906. As discussed above in conjunction with the discussion of FIG. 9, the results of predicate step 908 are stored in a temporary table, and thereafter used by recursion setup step 912 that, when executed, retrieves the results stored in that temporary table.

In this manner, data may be communicated from one step of multi-step sequence to another step of multi-step sequence. In addition to temporary tables, however, embodiments of multi-step query plan generator 710 may generate multi-step sequences wherein step is enabled to pass discrete scalar values to other steps.

Embodiments of relational database system 702, may also operate according to FIG. 15. FIG. 15 shows a flowchart 1500 of a method for processing a query to generate a query plan that includes first and second sub-plans, each configured to generate sub-plan results, and wherein the second sub-plan re-uses the sub-plan results of the first sub-plan during subsequent executions. Flowchart 1500 begins at step 1502.

At step 1502, a first sub-plan comprising at least one execution step is generated. For example, in embodiments, query optimizer 708 may operate in conjunction with multi-step query plan generator 710 to generate query plan 720 to include an execution step or set of execution steps (i.e., multi-step sequence). Operation of flowchart 1500 continues at step 1504.

At step 1504, the first sub-plan is executed to generate a first sub-plan result. For example, and as discussed above in conjunction with the discussion of at least FIGS. 6, 7 and 9, an instance of multi-step sequence 602 may be executed by multi-step query plan executor 714 of query execution engine 712 to generate a query sub-result.

At step 1506, a second sub-plan comprising at least one execution step is generated based at least in part on the first sub-plan result, the second sub-plan configured to generate a second sub-plan result when executed by the query execution engine, and wherein any subsequent execution of the second sub-plan will reuse the first sub-plan result. In an embodiment, query optimizer 708 and multi-step query generator 710 of relational database system 702 may be configured to generate multi-step sequence 602 that depends at least in part on a query sub-result. Such a multi-step sequence may comprise the second sub-plan of step 1506. Of course, execution of the second sub-plan (which may be a multi-step sequence) will itself generate a second sub-plan result. Embodiments of query optimizer 708 may be configured to cache the second sub-plan for reuse for subsequent executions of that plan, and without requiring rerunning the first sub-plan to obtain first sub-plan result.

Alternatively, embodiments may function according to flowchart 1600 of FIG. 16 showing a method for processing a query by regenerating a portion of the query plan during execution of the query plan. Flowchart 1600 begins at step 1602. At step 1602, a portion of a query plan is regenerated during execution of the query plan. For example, embodiments of relational database system 702 in conjunction query optimizer 708 and multi-step query plan generator 710 may generate a query plan 720 including first and second multi-step sequences 602. During execution of query plan 720, embodiments may cause, for example, the portion of query plan 720 corresponding to the second multi-step sequence to be recompiled. Such runtime recompilation may be advantageous where query optimizer 708 made incorrect assumptions during optimization of the query to produce query plan 720, and such incorrect assumptions or discovered by executing the first multi-step sequence.

Note that foregoing general description of the operation of relational database system 702 is provided for example, and embodiments of relational database system 702 may operate in manners different than described above. Furthermore, not all steps of flowcharts 1000-1600 of FIGS. 10-16 need to be performed in all embodiments. Furthermore, the steps of flowcharts 1000 and 1500 may be performed in orders different than shown in some embodiments.

III. Example Computer System Implementation

Relational database system 702, flowchart 1000, flowchart 1100, flowchart 1200, flowchart 1300, and/or flowchart 1400, flowchart 1500, and/or flowchart 1600 may be implemented in hardware, or hardware combined with software and/or firmware. For example, relational database system 702, flowchart 1000, flowchart 1100, flowchart 1200, flowchart 1300, and/or flowchart 1400, flowchart 1500, and/or flowchart 1600 may be implemented as computer program code/instructions configured to be executed in one or more processors and stored in a computer readable storage medium. Alternatively, relational database system 702, flowchart 1000, flowchart 1100, flowchart 1200, flowchart 1300, flowchart 1400, flowchart 1500, and/or flowchart 1600 may be implemented as hardware logic/electrical circuitry.

For instance, in an embodiment, one or more, in any combination, of relational database system 702, flowchart 1000, flowchart 1100, flowchart 1200, flowchart 1300, flowchart 1400, flowchart 1500, and/or flowchart 1600 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 17:
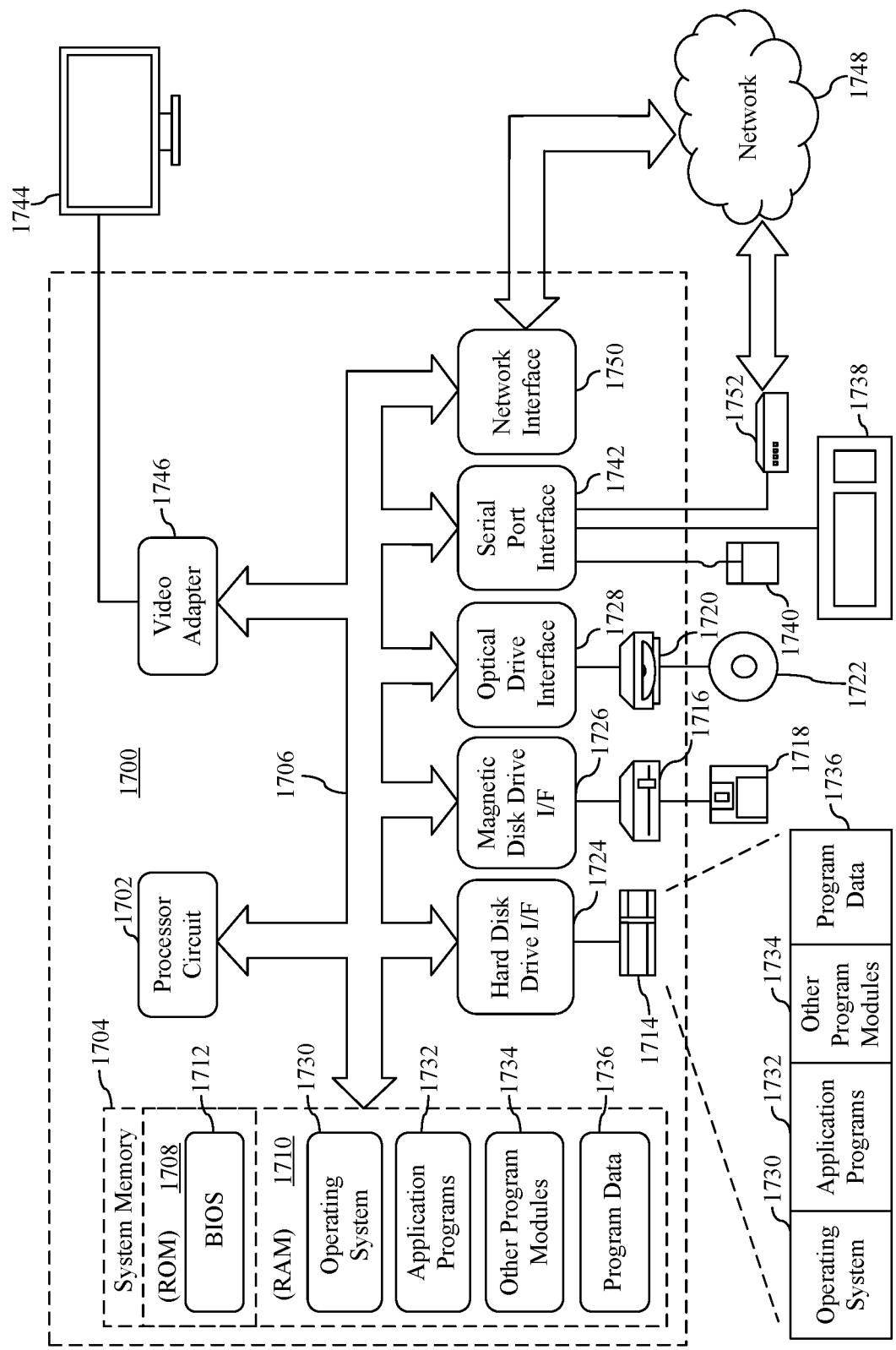
FIG. 17 is a block diagram of an example processor-based computer system that may be used to implement various embodiments.

FIG. 17 depicts an exemplary implementation of a computing device 1700 in which embodiments may be implemented. For example, relational database system 702 may be implemented using one or more computing devices similar to computing device 1700 in stationary or mobile computer embodiments, including one or more features of computing device 1700 and/or alternative features. The description of computing device 1700 provided herein is provided for purposes of illustration, and is not intended to be limiting. Embodiments may be implemented in further types of computer systems, as would be known to persons skilled in the relevant art(s).

As shown in FIG. 17, computing device 1700 includes one or more processors, referred to as processor circuit 1702, a system memory 1704, and a bus 1706 that couples various system components including system memory 1704 to processor circuit 1702. Processor circuit 1702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1702 may execute program code stored in a computer readable medium, such as program code of operating system 1730, application programs 1732, other programs 1734, etc. Bus 1706 represents one or more of any of several types of bus structures, including a memory bus or memory controller, a peripheral bus, an accelerated graphics port, and a processor or local bus using any of a variety of bus architectures. System memory 1704 includes read only memory (ROM) 1708 and random access memory (RAM) 1710. A basic input/output system 1712 (BIOS) is stored in ROM 1708.

Computing device 1700 also has one or more of the following drives: a hard disk drive 1714 for reading from and writing to a hard disk, a magnetic disk drive 1716 for reading from or writing to a removable magnetic disk 1718, and an optical disk drive 1720 for reading from or writing to a removable optical disk 1722 such as a CD ROM, DVD ROM, or other optical media. Hard disk drive 1714, magnetic disk drive 1716, and optical disk drive 1720 are connected to bus 1706 by a hard disk drive interface 1724, a magnetic disk drive interface 1726, and an optical drive interface 1728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1730, one or more application programs 1732, other programs 1734, and program data 1736. Application programs 1732 or other programs 1734 may include, for example, computer program logic (e.g., computer program code or instructions) for implementing relational database system 702, flowchart 1000, flowchart 1100, flowchart 1200, flowchart 1300, and/or flowchart 1400, flowchart 1500, and/or flowchart 1600, and/or further embodiments described herein.

A user may enter commands and information into the computing device 1700 through input devices such as keyboard 1738 and pointing device 1740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1702 through a serial port interface 1742 that is coupled to bus 1706, but may be connected by other interfaces, such as a parallel port, game port, or a universal serial bus (USB).

A display screen 1744 is also connected to bus 1706 via an interface, such as a video adapter 1746. Display screen 1744 may be external to, or incorporated in computing device 1700. Display screen 1744 may display information, as well as being a user interface for receiving user commands and/or other information (e.g., by touch, finger gestures, virtual keyboard, etc.). In addition to display screen 1744, computing device 1700 may include other peripheral output devices (not shown) such as speakers and printers.

Computing device 1700 is connected to a network 1748 (e.g., the Internet) through an adaptor or network interface 1750, a modem 1752, or other means for establishing communications over the network. Modem 1752, which may be internal or external, may be connected to bus 1706 via serial port interface 1742, as shown in FIG. 17, or may be connected to bus 1706 using another interface type, including a parallel interface.

As used herein, the terms "computer program medium," "computer-readable medium," and "computer-readable storage medium" are used to refer to physical hardware media such as the hard disk associated with hard disk drive 1714, removable magnetic disk 1718, removable optical disk 1722, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1732 and other programs 1734) may be stored on the hard disk, magnetic disk, optical disk, ROM, RAM, or other hardware storage medium. Such computer programs may also be received via network interface 1750, serial port interface 1742, or any other interface type. Such computer programs, when executed or loaded by an application, enable computing device 1700 to implement features of embodiments described herein. Accordingly, such computer programs represent controllers of the computing device 1700.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

In one embodiment, a system is provided. The system comprises: a query pre-processor configured to receive a query and construct a query tree of logical operators; a query optimizer configured to generate an executable query plan based at least in part on the query tree of logical operators, the executable query plan comprising at least a set of execution steps configured to be executed to generate a first query sub-result, the set of execution steps comprising: an initial step configured to be executed to generate first step results after receiving execution control, and pass execution control to a step different than the initial step, at least one intermediate step configured to generate second step results after receiving execution control, and pass execution control to any step of the set of execution steps, and a final step configured to, after receiving execution control, generate the first query sub-result based at least in part on the initial step results and the intermediate step results; and a query execution engine configured to execute the query to generate a final query result based at least in part on the first query sub-result by passing execution control to the initial step of the set of execution steps of the executable query plan.

In an embodiment of the foregoing system, the executable query plan further comprises: a second set of execution steps configured to generate a second query sub-result; and the query execution is configured to execute the query to generate the final query result further based at least in part on the second query sub-result.

In another embodiment of the foregoing system, the at least one intermediate step is further configured to pass execution control to any execution step in the executable query plan.

In an embodiment of the foregoing system, the query optimizer is configured to generate the executable query plan to include an execution step configured to communicate data to one or more other execution steps of the executable query plan.

In another embodiment of the foregoing system, the query optimizer is further configured to generate the executable query plan by including third and fourth sets of executions steps, each of the third and fourth sets of executions steps configured to be executed in the alternative; and the query execution engine is further configured to determine which of the third and fourth sets of execution steps to execute while the executable query plan is being executed.

In an embodiment of the foregoing system, the query execution engine is configured to determine which of the third and fourth sets of execution steps to execute based at least in part on at least one of a step result of any execution step of the executable query plan, or an intermediate query result of any other set of execution steps of the executable query plan.

In another embodiment of the foregoing system, the query execution engine is configured to determine which of the third and fourth sets of execution steps to execute based at least in part on whether an optional parameter is included in the query.

In an embodiment of the foregoing system, wherein, to generate the executable query plan, the query optimizer is further configured to: generate a first sub-plan comprising at least one execution step configured to generate a first sub-plan result; execute the first sub-plan to generate the first sub-plan result; and generate a second sub-plan comprising at least one execution step based at least in part on the first sub-plan result, the second sub-plan configured to generate a second sub-plan result when executed by the query execution engine, and wherein any subsequent execution of the second sub-plan will re-use the first sub-plan result.

In another embodiment of the foregoing system, the query optimizer is configured to re-generate at least a portion of the executable query plan during execution of the executable query plan.

A computer-implemented method of executing a query to generate a query result is provided. In an embodiment, the computer-implemented method comprises: receiving a query in a database application; processing the query, wherein said processing the query comprises: generating a query plan for the query, the query plan comprising at least a set of execution steps configured to be executed to generate a first query sub-result, the set of execution steps comprising: an initial step configured to be executed to generate first step results after receiving execution control, and pass execution control to a step different than the initial step, at least one intermediate step configured to generate second step results after receiving execution control, and pass execution control to any step of the set of execution steps, and a final step configured to, after receiving execution control, generate the first query sub-result based at least in part on the initial step results and the intermediate step results; and executing the query to generate a final query result based at least in part on the first query sub-result by passing execution control to the initial step of the set of execution steps of the query plan.

In an embodiment of the foregoing method, the query plan further comprises: a second set of execution steps configured to generate a second query sub-result; and wherein said executing the query to generate the final query result further comprises: executing the query to generate the final query result further based at least in part on the second query sub-result.

In an embodiment of the foregoing method, the at least one intermediate step comprises a recursive step configured to generate recursive step results and pass execution control to itself unless the recursive step results satisfy a pre-defined condition.

In another embodiment of the foregoing method, generating a query plan for the query comprises: generating the query plan to include an execution step configured to communicate data to one or more other execution steps of the query plan.

In an embodiment of the foregoing method, said generating a query plan for the query comprises: generating the query plan to include third and fourth sets of executions steps, each of the third and fourth sets of executions steps configured to be executed in the alternative; and wherein said processing the query further comprises: determining which of the third and fourth sets of execution steps to execute.

In another embodiment of the foregoing method, said determining which of the third and fourth sets of execution steps to execute comprises: determining which of the third and fourth sets of execution steps to execute based at least in part on at least one of a step result of any other execution step of the query plan, or an intermediate query result of any other set of execution steps of the query plan.

In an embodiment of the foregoing method, said determining which of the third and fourth sets of execution steps to execute comprises: determining which of the third and fourth sets of execution steps to execute based at least in part on an optional parameter included in the query.

In another embodiment of the foregoing method, generating a query plan for the query further comprises: generating a first sub-plan comprising at least one execution step configured to generate a first sub-plan result; executing the first sub-plan to generate the first sub-plan result; and generating a second sub-plan comprising at least one execution step based at least in part on the first sub-plan result, the second sub-plan configured to generate a second sub-plan result when executed by the query execution engine, and wherein any subsequent execution of the second sub-plan will re-use the first sub-plan result.

In an embodiment of the foregoing method, said processing the query further comprises: re-generating at least a portion of the query plan during execution of the query plan.

In still another embodiment, a computer-readable memory device having computer program code recorded thereon that when executed by at least one processor of a computing device causes the at least one processor to perform operations is provided.

In an embodiment of the foregoing computer-readable memory device, the operations comprise: receiving a query in a database application; processing the query, wherein said processing the query comprises: generate a query plan for the query, the query plan comprising at least a set of execution steps configured to be executed to generate a first query sub-result, the set of execution steps comprising: an initial step configured to be executed to generate first step results after receiving execution control, and pass execution control to a step different than the initial step, at least one intermediate step configured to generate second step results after receiving execution control, and pass execution control to any step of the set of execution steps, and a final step configured to, after receiving execution control, generate the first query sub-result based at least in part on the initial step results and the intermediate step results; and executing the query to generate a final query result based at least in part on the first query sub-result by passing execution control to the initial step of the set of execution steps of the query plan.

In another embodiment of the foregoing computer-readable memory device, the at least one intermediate step comprises a recursive step configured to generate recursive step results and pass execution control to itself unless the recursive step results satisfy a pre-defined condition.

V. CONCLUSION

While various embodiments of the present application have been described above, it should be understood that they have been presented by way of example only, and not limitation. It will be understood by those skilled in the relevant art(s) that various changes in form and details may be made therein without departing from the spirit and scope of the application as defined in the appended claims. Accordingly, the breadth and scope of the present application should not be limited by any of the above-described exemplary embodiments, but should be defined only in accordance with the following claims and their equivalents.

What is claimed is:

1. A computer-implemented method to execute a query to generate a query result, the method comprising:
   receiving a query in a database application;
   determining that the query includes a repeated MATCH expression;
   generating an executable query plan for the query by expanding the repeated MATCH expression into at least an anchor member, a recursive member, and an outer SELECT query, the executable query plan comprising a first set of execution steps that includes at least one intermediate recursive step to perform the repeated MATCH expression, and a final step; and
   executing the executable query plan to generate a query result by:
      executing the intermediate recursive step to generate intermediate recursive step results;
      determining, based on the intermediate recursive step results, which execution step of the first set of execution steps to which execution control should be passed;
      passing execution control to the determined execution step of the first set of execution steps; and
      executing the final step to generate the query result based at least in part on the intermediate recursive step results.

2. The computer-implemented method of claim 1, wherein said determining, based on the intermediate recursive step results, which execution step of the first set of execution steps to which execution control should be passed comprises:
   determining that execution should pass to the intermediate recursive step unless the intermediate recursive step results satisfy a pre-defined condition.

3. The computer-implemented method of claim 1, further comprising:
   re-generating at least a portion of the executable query plan during execution of the executable query plan.

4. The computer-implemented method of claim 1, wherein the query is a graph query against graph data stored as node and edge tables in a relational database.

5. The computer-implemented method of claim 4, wherein the graph query is a shortest path graph query and the query result returns a shortest path between nodes in the graph data.

6. The computer-implemented method of claim 1, wherein said generating an executable query plan for the query comprises:
   expanding the repeated MATCH expression in both the left-to-right direction and the right-to-left direction.

7. The computer-implemented method of claim 1, wherein said passing execution control to the determined execution step of the first set of execution steps comprises:
   passing execution control to an initial step of the first set of execution steps.

8. A system, comprising:
   a processor, and
   a computer-readable medium encoded with computer-executable instructions that, when executed by the processor, cause the processor to:
      receive a query;
      determine that the query includes a repeated MATCH expression;
      generate an executable query plan by expanding the repeated MATCH expression into at least an anchor member, a recursive member, and an outer SELECT query, the executable query plan comprising a first set of execution steps that includes at least one intermediate recursive step to perform the repeated MATCH expression, and a final step; and
      execute the executable query plan to generate a query result by:
         executing the intermediate recursive step to generate intermediate recursive step results;
         determining, based on the intermediate recursive step results, which execution step of the first set of execution steps to which control should be passed;
         passing execution control to the determined execution step of the first set of execution steps; and
         executing the final step to generate the query result based at least in part on the intermediate recursive step results.

9. The system of claim 8, wherein, to determine, based on the intermediate recursive step results, which execution step of the first set of execution steps to which execution control should be passed, the computer-executable instructions, when executed by the processor, cause the processor to:
   determine that execution should pass to the intermediate recursive step unless the intermediate recursive step results satisfy a pre-defined condition.

10. The system of claim 8, wherein the computer-executable instructions, when executed by the processor, further cause the processor to:
   re-generate at least a portion of the executable query plan during execution of the executable query plan.

11. The system of claim 8, wherein the query is a graph query against graph data stored as node and edge tables in a relational database.

12. The system of claim 11, wherein the graph query is a shortest path graph query and the query result returns a shortest path between nodes in the graph data.

13. The system of claim 8, wherein, to generate an executable query plan, the computer-executable instructions, when executed by the processor, cause the processor to:
   expand the repeated MATCH expression in both the left-to-right direction and the right-to-left direction.

14. The system of claim 8, wherein said passing execution control to the determined execution step of the first set of execution steps comprises:
   passing execution control to an initial step of the first set of execution steps.

15. A computer-readable memory device having computer program code recorded thereon that, when executed by a processor, causes the processor to:
- receive a query;
- determine that the query includes a repeated MATCH expression;
- generate an executable query plan by expanding the repeated MATCH expression into at least an anchor member, a recursive member, and an outer SELECT query, the executable query plan comprising a first set of execution steps that includes at least one intermediate recursive step to perform the repeated MATCH expression, and a final step; and
- execute the executable query plan to generate a query result by:
  - executing the intermediate recursive step to generate intermediate recursive step results;
  - determining, based on the intermediate recursive step results, which execution step of the first set of execution steps to which control should be passed;
  - passing execution control to the determined execution step of the first set of execution steps; and
  - executing the final step to generate the query result based at least in part on the intermediate recursive step results.

16. The computer-readable memory device of claim 15, wherein, to determine, based on the intermediate recursive step results, which execution step of the first set of execution steps to which execution control should be passed, the computer program code, when executed by the processor, causes the processor to:
- determine that execution should pass to the intermediate recursive step unless the intermediate recursive step results satisfy a pre-defined condition.

17. The computer-readable memory device of claim 15, wherein the computer program code, when executed by the processor, further causes the processor to:
- re-generate at least a portion of the executable query plan during execution of the executable query plan.

18. The computer-readable memory device of claim 15, wherein the query is a shortest path graph query against graph data stored as node and edge tables in a relational database and the query result returns a shortest path between nodes in the graph data.

19. The computer-readable memory device of claim 15, wherein, to generate an executable query plan, the computer program code, when executed by the processor, causes the processor to:
- expand the repeated MATCH expression in both the left-to-right direction and the right-to-left direction.

20. The computer-readable memory device of claim 15, wherein said passing execution control to the determined execution step of the first set of execution steps comprises:
- passing execution control to an initial step of the first set of execution steps.

\* \* \* \* \*